May 26, 1925.

G. H. PHELPS 1,539,593

PRODUCTION OF RINGS AND THE LIKE

Filed Oct. 5, 1923

Inventor
George H. Phelps
By his Attorney
W. Anthony Urina

Patented May 26, 1925.

1,539,593

UNITED STATES PATENT OFFICE.

GEORGE H. PHELPS, OF WAREHOUSE POINT, CONNECTICUT, ASSIGNOR TO THOMAS E. MURRAY, OF BROOKLYN, NEW YORK.

PRODUCTION OF RINGS AND THE LIKE.

Application filed October 5, 1923. Serial No. 666,715.

*To all whom it may concern:*

Be it known that I, GEORGE H. PHELPS, a citizen of the United States, and resident of Warehouse Point, Connecticut, have invented certain new and useful Improvements in the Production of Rings and the like, of which the following is a specification.

In a patent of Murray, No. 1,455,640 of February 20, 1923, it is proposed to make pole carrying rings for electric generators, motors and the like of sheet metal stamped into segments, which segments are welded together along their edges.

In making such rings and other tubular articles, there is generally a flash or burr of metal projecting from both surfaces of the product which, for most uses, has to have these surfaces smoothed by cutting or grinding off the burrs.

My present invention aims to provide a method of production of rings of this class which will be produced with a smooth surface, or with both surfaces smooth, eliminating the necessity of removing the burrs at one or both the surfaces by avoiding the formation of such burrs. Incidentally the metal is of less thickness at the point or points of the weld. The product, therefore, while of less strength at this point is sufficiently strong for practical purposes and is more cheaply produced. Also the surface may be made more accurate than where it is obtained by the cutting or grinding away of a burr.

The accompanying drawings illustrate embodiments of the invention.

Referring to the accompanying drawings, segments 1 are formed, preferably by stamping from heavy sheet metal. They are placed with opposed edges and with inserts 2 between such edges. They are then pressed toward each other while a welding current is passed across the edges and through the inserts. Preferably the method of welding is that described in the Murray Reissue Patent No. 15,466 of October 10, 1922, using a current of extremely high ampere strength or density per unit of area of the contact surfaces and of very brief duration. This method effects an excellent weld. It produces, however, a lateral extrusion of the metal which is difficult to control. For this reason the present invention is particularly useful with this welding method. Also with this method the current and the heat are concentrated through the comparatively narrow insert and a strong weld is secured through such insert.

Figure 1:
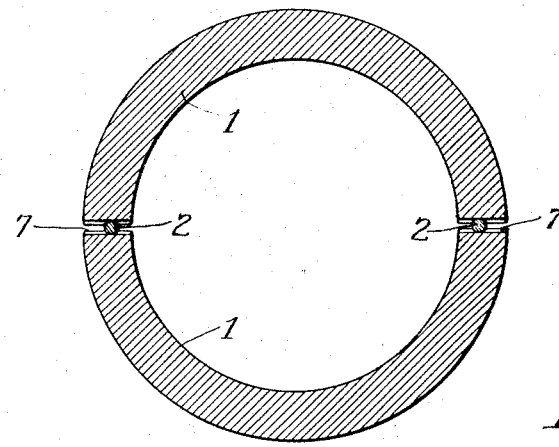
Fig. 1 is a cross-section of two ring segments with inserts between their edges preparatory to welding.
Figure 3:
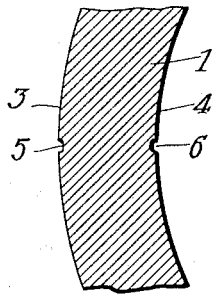
Fig. 3 is a section similar to Fig. 1 showing one of the welded joints.

The insert 2 may be a round steel wire, as in Fig. 1, of less width than the edges of the segments and located at such a distance inward from both faces that when the weld is completed, as shown in Fig. 3, the metal although spread out laterally will not project beyond the surface of the article. Preferably, at both the outer surface 3 and the inner surface 4, there will be shallow recesses 5 and 6.

It is not always of the same importance to secure both surfaces smooth. The inserts may be so arranged that they will leave the outer surface 3 smooth, that is without a projecting flash, but will be extruded slightly beyond the inner surface 4, producing a flash which may be unobjectionable, or which may be removed if desired; or, of course, the position of the insert may be reversed so as to produce a smooth inner surface only.

The extent to which the parts are pressed together will be controlled by stops which limit their movement under the pressure of the welding machine, or it may be by stops or cold surfaces on the segments which come together and prevent further movement. Both these methods of limiting the operation are known in connection with other welding operations.

Figure 2:
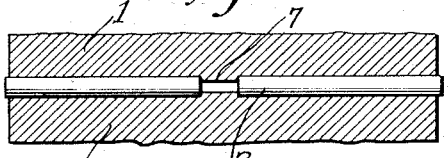
Fig. 2 is a longitudinal section of the same.

In Fig. 2, for example, the edges of the segments 1 are formed with slightly projecting portions 7 which limit the movement of the segments toward each other. The insert 2 in this case is shown in two separate pieces, and it will be understood that any number of such pieces may be used along the length of the joint and either separated from each other at their ends or making contact. Also a single limiting projection 7 may be used on one of the segments only.

Figure 5:
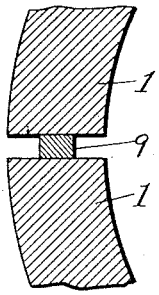
Figs. 4 and 5 are similar sections illustrating modifications.
Figure 4:
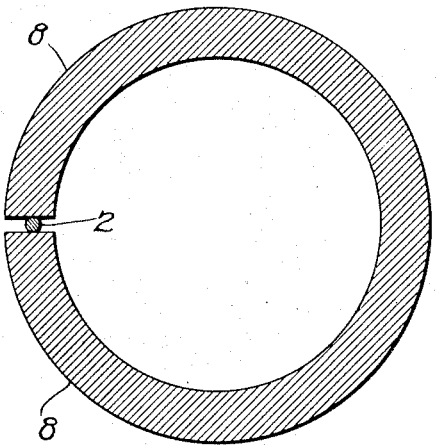

The process may be applied to the uniting of more than two segments to produce the completed article. Or it may be applied, as in Fig. 4, to unite the two end portions 8 of a one-piece split ring. For this purpose an insert 2 of round wire will be placed between the parts 8 and the latter pressed together under the application of a current as described in connection with Fig. 1. Instead of using a round wire, inserts of other shape may be used, such as the rectangular insert 9 shown in Fig. 5.

Although the inserts illustrated are separate pieces of metal, I use the term to include equally pieces which may be integral with the parts to be united, these pieces being of less width than the edges; and the pressure, current and other conditions being so regulated as to keep the lateral flow of metal within one or both of the surfaces of the finished article.

The process, of course, is directed to segments of comparatively thick metal, whose edges have a substantial width. The segments may be formed of sufficiently heavy sheet metal bent to the initial shape required, or may be formed in various other ways.

Though I have described with great particularity of detail certain embodiments of my invention, yet it will be understood that the invention is not restricted to the particular embodiments disclosed. Various modifications may be made without departing from the invention as defined in the following claims.

What I claim is:

1. The method of uniting the edges of metal parts which consists in locating an insert between such edges, passing a welding current across such edges and through the entire width of such insert and pressing the edges toward each other to produce a weld, the insert overlying less than the full width of the edges and the movement of the parts toward each other being so limited as to avoid the forming of a burr projecting beyond a face of the welded article.

2. The method of uniting the edges of metal parts which consists in locating an insert between such edges, passing a welding current across such edges and through the entire width of such insert and pressing the edges toward each other to produce a weld, the insert being of less width than the edges and located at a distance from both faces and the movement of the parts toward each other being so limited as to avoid the forming of a burr projecting beyond either face of the welded article.

3. The method of uniting the edges of segments to form a tubular article which consists in placing an insert between such edges, passing a welding current across such edges and through the entire width of such insert and pressing the edges toward each other to produce a weld, the insert overlying less than the full width of the edges and the movement of the parts toward each other being so limited as to avoid the forming of a burr projecting beyond a face of the welded article.

4. The method of uniting the edges of segments to form a tubular article which consists in placing an insert between such edges, passing a welding current across such edges and through the entire width of such insert and pressing the edges toward each other to produce a weld, the insert being of less width than the edges and located at a distance from both faces and the movement of the parts toward each other being so limited as to avoid the forming of a burr projecting beyond either face of the welded article.

5. The method of uniting the edges of metal parts which consists in locating an insert between such edges, passing across such edges and through the entire width of such insert a welding current of extremely high ampere strength per unit of area of the contact surface and of very brief duration and pressing the edges toward each other to produce a weld, the insert overlying less than the full width of the edges and the movement of the parts toward each other being so limited as to avoid the forming of a burr projecting beyond a face of the welded article.

6. The method of making a ring for electrical apparatus or the like which consists in forming segments of such a ring and uniting the edges of said segments by locating an insert between such edges, passing a welding current across such edges and through the entire width of such insert and pressing the edges toward each other to produce a weld, the insert overlying less than the full width of the edges and the movement of the segments toward each other being so limited as to avoid the forming of a burr projecting beyond a face of the welded ring.

7. An article of manufacture including two comparatively thick metal parts located edge to edge with intermediate metal between them covering less than the full thickness of said parts said parts being welded together through said intermediate metal.

8. A tubular article of manufacture including segmental parts of comparatively thick metal, their longitudinal edges being united with intermediate metal between them covering less than the full thickness of the segmental parts, said segmental parts being welded together through said intermediate metal.

9. A ring for electrical apparatus or the like composed of segmental parts of comparatively thick metal having their longitudinal edges united with intermediate metal between them covering less than the full thickness of the segmental parts, said segmental parts being welded together through said intermediate metal.

10. A tubular article of manufacture of comparatively thick metal having at least one longitudinal joint composed of edges united with intermediate metal between them covering less than the full thickness of the article, said edges being welded together through said intermediate metal.

In witness whereof, I have hereunto signed my name.

GEORGE H. PHELPS.